(12) United States Patent
King

(10) Patent No.: US 8,131,077 B2
(45) Date of Patent: Mar. 6, 2012

(54) SYSTEMS AND METHODS FOR SEGMENTING AN IMAGE BASED ON PERCEPTUAL INFORMATION

(75) Inventor: Paul King, San Francisco, CA (US)

(73) Assignee: FlashFoto, Inc., Los Gatos, CA (US)

( * ) Notice: Subject to any disclaimer, the term of this patent is extended or adjusted under 35 U.S.C. 154(b) by 1008 days.

(21) Appl. No.: 12/061,633

(22) Filed: Apr. 2, 2008

(65) Prior Publication Data

US 2008/0247647 A1 Oct. 9, 2008

Related U.S. Application Data

(60) Provisional application No. 60/909,912, filed on Apr. 3, 2007.

(51) Int. Cl.
*G06K 9/34* (2006.01)
(52) U.S. Cl. ....................................................... 382/173
(58) Field of Classification Search .................. 382/173, 382/190, 191, 218, 224, 232; 375/240.08, 375/240.26
See application file for complete search history.

(56) References Cited

U.S. PATENT DOCUMENTS

| | | | |
|---|---|---|---|
| 6,421,459 B1 | 7/2002 | Rowe | |
| 6,429,950 B1 | 8/2002 | Ebner | |
| 6,687,397 B2 | 2/2004 | Deyong et al. | |
| 6,741,655 B1 * | 5/2004 | Chang et al. | 375/240.26 |
| 7,912,291 B2 * | 3/2011 | Berkner et al. | 382/190 |

OTHER PUBLICATIONS

PCT International Bureau, International Preliminary Report on Patentability dated Oct. 15, 2009 for International Application No. PCT/US2008/004335.
International Search Report and Written Opinion dated Jul. 8, 2008 for PCT/US08/04335.
Russ, 2002, "Chapter 1—Acquiring Images," The Image Processing Handbook, 4th Ed., pp. 1-77.
Russ, 2002, "Chapter 4—Image Enhancement (Processing in the Spatial Domain)," The Image Processing Handbook, 4th Ed., pp. 207-275.
Russ, 2002, "Chapter 6—Segmentatoin and Thresholding," The Image Processing Handbook, 4th Ed., pp. 333-381.
Russ, 2002, "Chapter 10—Feature Recognition and Classification," The Image Processing Handbook, 4th Ed., pp. 527-554.

* cited by examiner

*Primary Examiner* — Jose Couso
(74) *Attorney, Agent, or Firm* — Osama Hussain, Esq.

(57) ABSTRACT

Systems for segmenting an image based on perceptual information and methods for making and using same. According to one embodiment, input channels from an image are derived and analyzed by heuristic metrics to create categorical estimates. Examples of categorical estimates include a foreground channel estimate and a background channel estimate. Once created, the categorical estimates are merged to create a final channel estimate. The final channel estimate may represent the foreground or background of an image. Optionally, noise removal will also be conducted to improve the segmentation.

30 Claims, 14 Drawing Sheets red green black grey blue yellow orange purple tex1 tex2 tex3 tex4

SYSTEMS AND METHODS FOR SEGMENTING AN IMAGE BASED ON PERCEPTUAL INFORMATION

CROSS REFERENCE TO RELATED APPLICATION

This application claims priority to a U.S. provisional patent application Ser. No. 60/909,912, filed Apr. 3, 2007, which is hereby incorporated by reference herein in its entirety.

BACKGROUND

With the advancement, ease of use, and decline of prices for digital cameras, the number of digital photographs and images throughout the world has increased enormously. Very often, the digital photographs and images are not completely satisfactory. Indeed, many computer aided techniques exist to manipulate, retouch, or otherwise edit digital photographs and images.

The success of these techniques has led the image processing industry to realize that users would like additional, more sophisticated techniques for editing their digital images. One technique sought after is the ability to distinguish or segment the foreground or subject of an image from the background. The difficult aspect of this technique is creating universal methods for determining the foreground or subject of any image. Some have decided to provide a partial solution (See e.g., Yu and Shi, "Object-Specific Figure-Ground Segmentation", 2003 IEEE Computer Society Conference on Computer Vision and Pattern Recognition, Proceedings, Volume 2, pages 39-45, which is hereby incorporated by reference herein in its entirety), but those solutions are not broad enough to solve the general problem of creating a system or method that would run effectively on any image. The major hurdle for creating such a system or method is the difficulties associated with having a computer perform the perceptual and psychological analyses a human brain performs when an image is seen.

As should be apparent, there is an unfulfilled need for systems and methods which would be able to distinguish or segment the foreground or subject of an image from the background. Further, there is an unfulfilled need for systems and methods for utilizing a computer to perform such a figure-ground segmentation in a manner that parallels human perception by using perceptual information.

SUMMARY

Systems for segmenting an image based on perceptual information and methods for making and using same are provided. According to one embodiment, input channels from an image are derived and analyzed by heuristic metrics to create categorical estimates. Examples of categorical estimates include a foreground channel estimate and a background channel estimate. Once created, the categorical estimates are merged to create a final channel estimate. The final channel estimate may represent the foreground or background of an image. Optionally, noise removal will also be conducted to improve the segmentation. Computer systems for performing any of the methods disclosed herein, computer program products encoding instructions for performing any of the methods disclosed herein, and computer readable encoding instructions for performing any of the methods disclosed herein are further provided.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles of the present invention.

Figure 1:
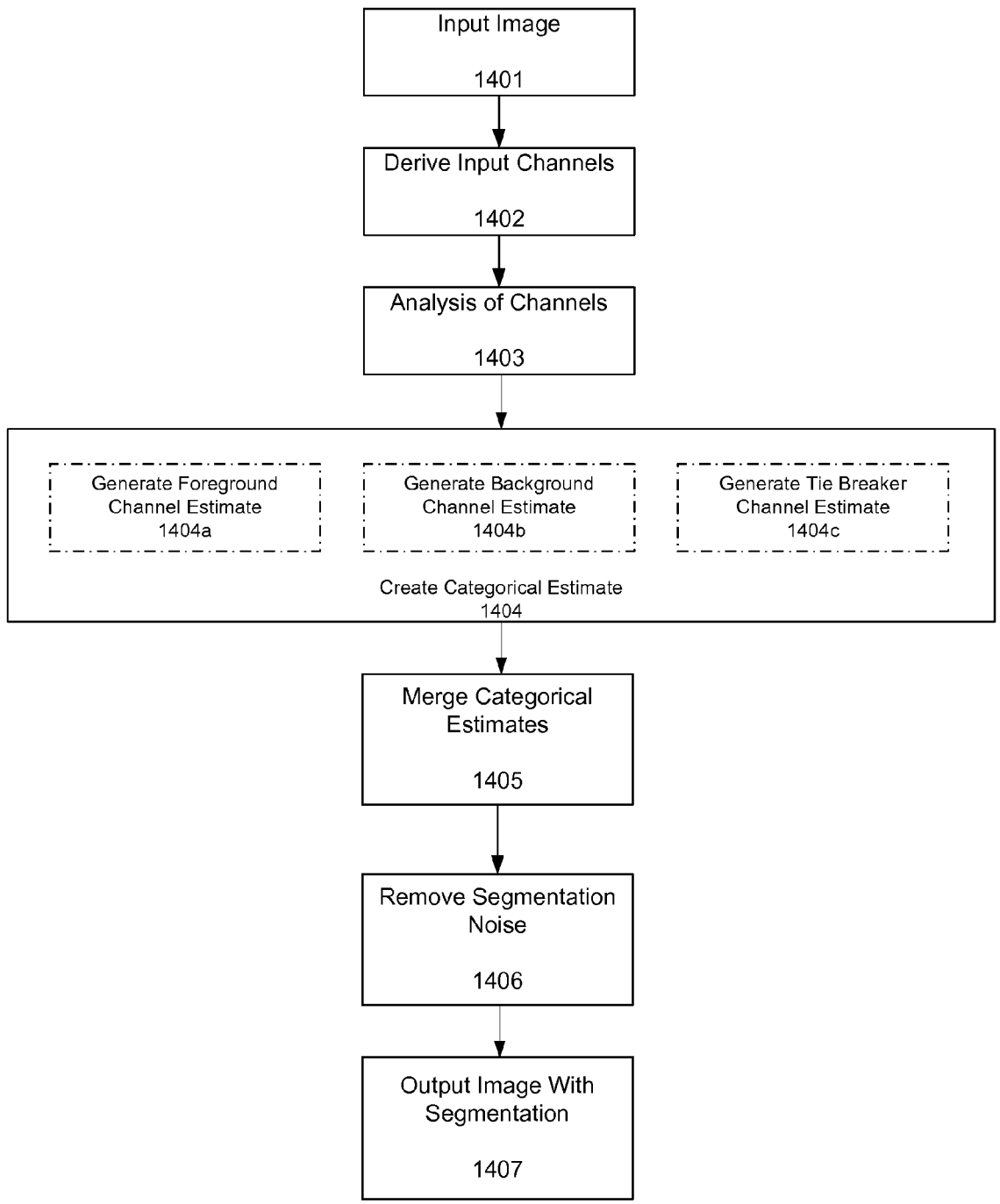
FIG. 1 is a top-level flow chart illustrating an exemplary embodiment of a method for segmenting an image based on perceptual information in accordance with an embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

A system for segmenting an image based on perceptual information and methods for making and using the same is provided. In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The disclosed embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed embodiments are not described with reference to any particular programming language. It will be appreciated that a variety of programming languages may be used to implement the teachings of the embodiments as described herein.

In computer vision, segmentation refers to the process of partitioning a digital image into multiple regions (sets of pixels). The goal of segmentation is to simplify and/or change the representation of an image into something that is more meaningful and easier to analyze. Image segmentation is typically used to locate objects and boundaries (lines, curves, etc.) in images. See, Russ, Fourth Edition, *The Image Processing Handbook*, CRC Press, Boca Raton, Fla., 2002, Chapter 6, pages 333-382, which is hereby incorporated by reference herein in its entirety.

The result of image segmentation is a set of regions that collectively cover the entire image. Each of the pixels in a region is related in some way. They may be similar with respect to some characteristic or computed property, such as color, intensity, or texture. Or they may be similar because they belong to the same visual object structure. Adjacent regions are significantly different with respect to the same one or more characteristics.

Several general-purpose algorithms and techniques have been developed for image segmentation. Since there is no general solution to the image segmentation problem, these techniques often have to be combined with domain knowledge in order to effectively solve an image segmentation problem for a problem domain.

In some embodiments an image is a bitmapped or pixmapped image. As used herein, a bitmap or pixmap is a type of memory organization or image file format used to store digital images. A bitmap is a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. Bitmaps and pixmaps are typically stored in a file or document representation as a digital image. Many storage representation formats for digital images are available, including: Windows Bitmap (BMP), InterLeaved Bitmap (ILBM), Portable Bitmap (PBM), X Bitmap (XBM), and Wireless Application Protocol Bitmap (WBMP), JPEG, TIFF, PNG, and GIF, just to name a few. More disclosure on bitmap images is found in Foley, 1995, *Computer Graphics: Principles and Practice*, Addison-Wesley Professional, p. 13, ISBN 0201848406 as well as Pachghare, 2005, Comprehensive Computer Graphics: Including $C^{+-}$, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a grayscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits.

The disclosed embodiments relate to systems and methods for segmenting an image based on perceptual information. The disclosed embodiments utilize visual information processing based on dynamic perceptual organization, and psychophysical principles. In one embodiment described below, the visual information processing will segment an image into foreground and background regions. Foreground is defined broadly as any region or regions of an image that one would consider to be the subject or object within the image. Often, the foreground of an image is referred to as "figure". Background is defined broadly as any region or regions of an image that one would consider not being the subject or object within the image. Often, the background of an image is referred to as "ground".

FIG. 1 is a top-level flow chart illustrating an exemplary embodiment of a method for segmenting an image based on perceptual information. In the present embodiment, an image is selected or inputted in step 1401. In some embodiments, the image is in digital form.

Once an image has been selected or inputted, input channels for the image are created or derived 1402. In one embodiment, input channels (hereinafter "channel" or "channels") represent sub-regions sharing common visual attribute classifications. Examples of common visual attribute classifications include, but are not limited to, color, or complex derived attributes based on local microstructure, such as texture or the local region color palette. For example, consider the case where a common visual attribute classification is color. In such an embodiment a plurality of channels are constructed where each channel represents color. Then, for a given channel in the plurality of channels, each respective pixel in the image is analyzed and given a weight that represents how well the respective pixel matches the color of the given channel. For instance, consider a channel for the color blue. In some embodiments, each respective pixel is analyzed and given a weight based on how similar the color of the pixel is to the color blue. Consider an image in which a person is wearing a blue tie and a blue sky is visible in the background. Pixels in the blue tie and the background will get high weight for the color blue whereas all other pixels in the image that are not blue will get low weights. In some embodiments, only those pixels in the image that have a weight that is a predetermined range are included in the blue channel. In some embodiments, the exemplary blue channel comprises data for each pixel in the image being processed. In such embodiments, pixels that do not share the property that characterizes a channel are not included in the channel. Further, in such embodiments, it is still quite possible that a single pixel in an image will end up in multiple channels. In some embodiments, a channel comprises data for each pixel in the image being processed. The process of analyzing each pixel in the image is performed for each of the channels in the plurality of channels.

It should be apparent to one skilled in the art that many common visual attribute classifications can exist for any given sub-region within an image. In some embodiments, two or more input channels are derived in step 1402. In some embodiments, three or more input channels, four or more input channels, five or more input channels, between two and twenty input channels, or more than ten input channels are derived in step 1402 where each such channel is based on color.

Figure 4:
FIG. 4 is an image in gray-scale provided to illustrate an exemplary embodiment of a method for segmenting an image based on perceptual information.

In one embodiment, color is the common visual attribute classification utilized to construct channels. FIG. 4 is a sample image utilized to illustrate an exemplary embodiment of a method for segmenting an image based on perceptual information. To create or derive the channels based on color as the common visual attribute classification, color binning is used in some embodiments of the present invention. Color binning refers to determining what color or colors lie within each pixel of an image and is sometimes also called color quantization. The color binning operation can comprise any conventional type of color binning, such as with the utilization of a fuzzy inference system to assign red-green-blue (RGB) pixels to predefined color categories.

Color binning can be performed on the white anchored image data either by using a fuzzy inference system, or by referring to lookup tables previously generated by the fuzzy inference system. The fuzzy inference system may determine fuzzy membership values for each image pixel relative to one or more colors. Once determined, the pixels which comprise the same colors (or fulfill a threshold value for fuzzy membership with that color) can be grouped together, or characterized as such, to create a channel. In one embodiment, once the color binning has completed, the image data can be utilized to create or derive a set of channels 1402. In another embodiment, the number of colors that were analyzed using the fuzzy inference system determines the number of colors in the output set from the color binning operation. In one embodiment, the number of channels based on color may be set arbitrarily or determined dynamically. In one embodiment, once the color binning has completed, an additional set of channels is derived dynamically based on texture properties.

Figure 5:
FIG. 5 illustrates sample color channels (red, green, black, and grey) displayed in gray-scale, created utilizing the image from FIG. 4 to illustrate the creation of different color channels, where the color black represents pixels or pixel regions not included in a given color channel, and the colors white to different shades of gray represent pixels or pixel regions included in a given color channel, the white to different shades of gray based on the weight of the pixel.
Figure 5:
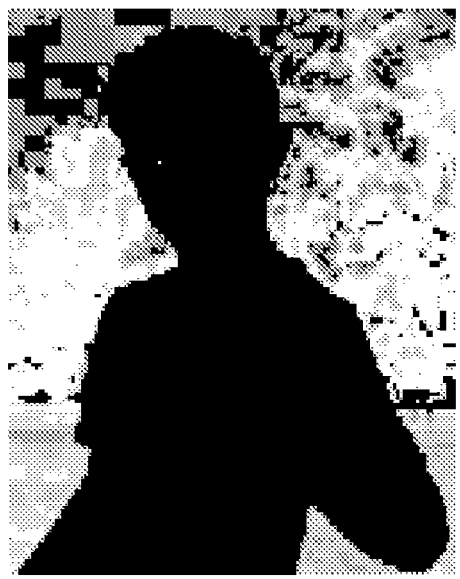
Figure 5:
Figure 5:
Figure 6:
FIG. 6 illustrates additional sample color channels (blue, yellow, orange, and purple) displayed in gray-scale, created utilizing the image from FIG. 4 to illustrate the creation of different color channels, where the color black represents pixels or pixel regions not included in a given color channel, and the colors white to different shades of gray represent pixels or pixel regions included in a given color channel, the white to different shades of gray based on the weight of the pixel.
Figure 6:
Figure 6:
Figure 6:

FIG. 5 comprises sample color channels (red, green, black, and grey) displayed in gray-scale, created utilizing the image from FIG. 4 to illustrate the creation of different color channels, where the color black represents pixels or pixel regions not included in a given color channel, and the colors white to different shades of gray represent pixels or pixel regions included in a given color channel, the white to different shades of gray based on the weight of the pixel. FIG. 6 comprises additional sample color channels (blue, yellow, orange, and purple) displayed in gray-scale, created utilizing the image from FIG. 4 to illustrate the creation of different color channels, where the color black represents pixels or pixel regions not included in a given color channel, and the colors white to different shades of gray represent pixels or pixel regions included in a given color channel, the white to different shades of gray based on the weight of the pixel.

In some embodiments, a channel comprises data for each pixel in the image being processed. For example, for each pixel location within the image, a color channel may hold data that represents the strength or weight (hereinafter "weight") of the color represented by the color channel. This representation could be based on the fuzzy membership value derived from a fuzzy inference system. One form of fuzzy inference system that can be used to generate and populate channels is fuzzy k-means clustering. For one exemplary fuzzy k-means clustering algorithm in accordance with the present invention see Duda, 2001, *Pattern Classification*, John Wiley & Sons, Inc., New York, pp. 528-530, which is hereby incorporated by reference herein in its entirety.

As stated above, it should be evident to one skilled in the art that a pixel may be included in more than one color channel. For example, in an image of a red apple, a pixel contained in the region of the apple may have a high fuzzy membership value with the color channel for red, medium fuzzy membership value with the color channel for pink, and low fuzzy membership value with the color channel for blue. The creation or derivation of data that represents weight of a pixel within a channel operation can comprise any conventional type of creation or deriving mechanism known in the art. The form of the data that represents the weight of a pixel within a channel can comprise any conventional type of form, including any sort of rating system or percentage value. For example, a rating system between 0 (zero) and 1 (one) could be used, where a value (e.g., 0.90) closer to 1 represents a stronger weight than a value (e.g., 0.30) that is closer to 0. In one embodiment, the weight of a pixel determines whether that pixel is included in a channel.

In an alternative embodiment, the common visual attribute classification utilized to form channels is texture information or data rather than color. In such embodiments, texture could be spatially repeating microstructure patterns in the image. These microstructure patterns may be luminance-based, as in the vertical lines making up a field of grass in an outdoor scene. The microstructure patterns may also involve spatially replicated color variation, such as the alternating red and white regions of a brick wall. In one embodiment, to create or derive the channels based on texture as the common visual attribute classification, both luminance-based and color-based patterns are analyzed and the most prevalent patterns are mapped to individual channels. For example, the number of individual channels based on texture could be based on each prominent textural pattern (such as vertically oriented green grass or a red/white brick region). In one embodiment, the number of channels based on texture may be set arbitrarily or determined dynamically. In some embodiments, three or more input channels, four or more input channels, five or more input channels, between two and twenty input channels, or more than ten input channels are derived in step 1402 where each such channel is based on texture. In some embodiments, three or more input channels, four or more input channels, five or more input channels, between two and twenty input channels, or more than ten input channels are derived in step 1402 where each such channel is based on a combination of prominent color and luminescent patterns.

Figure 7:
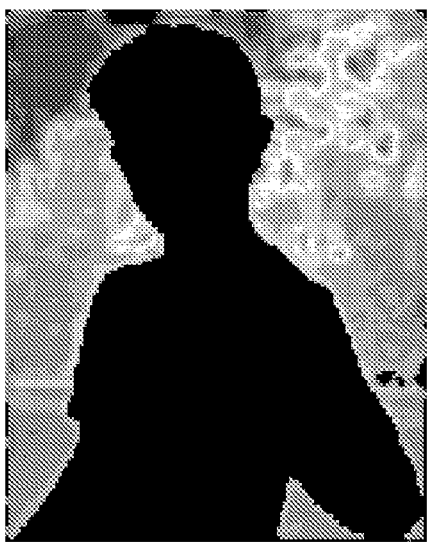
FIG. 7 illustrates four sample texture channels (tex1, tex2, tex3, tex4) derived dynamically, displayed in gray-scale, created utilizing the image from FIG. 4, according to one embodiment, to illustrate the creation of different texture channels, where the color black represents pixels or pixel regions not included in a given texture channel, and the colors white to different shades of gray represent pixels or pixel regions included in a given texture channel, the white to different shades of gray based on the weight of the pixel.
Figure 7:
Figure 7:
Figure 7:

In one embodiment, texture channels are derived dynamically as follows: 1) the image is processed for oriented edge elements as well as color information; 2) these pixel-scale features are clustered in n-dimensional feature space according to the statistical frequency in the particular target image (e.g., this clustering could be performed using the k-means algorithm); 3) the most common clusters are used to represent texture prototypes; and 4) a texture channel is generated for each texture prototype that identifies the regions of the image most closely matching that prototype. FIG. 7 comprises four sample texture channels (tex1, tex2, tex3, tex4) derived dynamically, displayed in gray-scale, created utilizing the image from FIG. 4, according to one embodiment, to illustrate the creation of different texture channels, where the color black represents pixels or pixel regions not included in a given texture channel, and the colors white to different shades of gray represent pixels or pixel regions included in a given texture channel, the white to different shades of gray based on the weight of the pixel.

In some embodiments, a pattern classification algorithm other than clustering can be used to organize the pixel-scale features (e.g., oriented edge elements, color information, etc.) into n-dimensional feature space. Such pattern classification algorithms include, but are not limited to, decision trees, multiple additive regression trees, neural networks, principal component analysis, nearest neighbor analysis, linear discriminant analysis, quadratic discriminant analysis, support vector machines, evolutionary methods, projection pursuit, radial basis functions, weighted voting, etc. See, for example, Duda, 2001, *Pattern Classification*, John Wiley & Sons, Inc., New York, which is hereby incorporated by reference herein for such purpose.

Each channel created or derived in step 1402 can then be analyzed in step 1403 according to heuristic metrics inspired by Gestalt psychology research, dynamic perceptual organization, and/or psychophysical principles. The goal of such an analysis is to determine which of the channels constructed in step 1402 contain pixels that, as a group, are more likely associated with the foreground of the image and which of the channels constructed in step 1402 contain pixels that, as a group, are more likely associated with the background of the image. Thus, for each respective channel constructed in step 1402, the properties of the pixels in the respective channels are analyzed using specific heuristics that are designed to determine whether the respective channel is more likely associated with the foreground or more likely associated with the background. It should be evident to one skilled in the art, based on the instant disclosure, that analysis of each channel can be conducted using one or more heuristic metrics.

Exemplary heuristic metrics that can be used to determine whether a channel should be regarded as foreground or background include, but are not limited to: dominance, outerness, and centeredness.

The "dominance" heuristic metric refers to the spatial extent of a region as measured by the fraction of the image's pixels that are included in a given channel. The underlying observation for the dominance heuristic metric is that the background of an image tends to contain a larger number of consistently colored pixels relative to the foreground of the image. Thus, a channel based on a particular color in which a significant portion of the highly weighted pixels in the channel fall in the same region of the image and have the same color will obtain a high score for the dominance heuristic. For example, consider an image that contains a subject wearing a blue tie against a backdrop of a blue sky in which a channel based on the color blue has been created in step 1402. The blue pixels in blue sky receive high weights. In fact the color channel is dominated by contiguous blue pixels in the blue sky. Each of these blue pixels in the blue sky has a similar color. Thus, in this instance, even though some of the blue pixels in the blue channel are found in the tie worn by the subject in the image, the color channel is dominated by the pixels that all have a similar blue color that are in the blue sky. In contrast, a channel based on a particular color in which a significant portion of the highly weighted pixels in the channel have highly divergent colors will obtain a low score for the dominance heuristic.

The "outerness" heuristic metric refers to the degree to which a region described by a channel occupies the area near the image frame. In one embodiment, the underlying observation for the outerness heuristic metric is the observation that colors appearing near the edge of the image frame are more likely to belong to the background than foreground of the image. For example, the pixels near the edge of the image may be weighted more highly than pixels near the center.

The "centeredness" heuristic metric refers to the degree to which pixels included in a channel occupy the central area of the image. In one embodiment, the underlying observation for the centeredness heuristic metric is that pixels near the center of the image are more likely to belong to the foreground of the image than to the background of the image. For example, the pixels near or at the center of the image may be weighted more highly than pixels near the image frame. According to one embodiment, from the sample channels provided in FIG. 5 and FIG. 6, the "grey" channel would receive a high dominance result, the "green" channel would receive a high outerness result, and the "orange" channel would receive a high centeredness result based on the heuristic metrics above. An example of an image having a channel that receives a high centeredness score under the centeredness heuristic metric is an image in which the only blue pixels in the image are contained within a blue tie worn by a subject (e.g., there is now blue sky visible in the image). For a blue color channel for the image, only pixels that are in the blue tie will receive a high weight and these pixels are located at the center of the image.

Thus, in step 1403, each input channel is scored against one or more heuristics. In such embodiments, each heuristic is used to give an input channel a score. For example, an input channel may have a separate score for dominance, outerness, and centeredness. Once each input channel has been analyzed in step 1403 according to one or more heuristic metrics, one or more categorical estimates are created 1404 for the image under analysis. A categorical estimate can be derived based on the likelihood, for example represented as a ranking or a score, of one or more channels being part of the categorical estimate. In some embodiments, a categorical estimate involves the combination of those input channels in the plurality of input channels that are most likely to belong in a certain category such as foreground or background. In one example, the categorical estimate is a foreground channel estimate and it is determined that the red channel and the blue channel should contribute to the foreground channel estimate but that the yellow channel should not. In typical embodiments, if a channel has a strong likelihood of being part of a categorical estimate, it will be utilized in the creation of the categorical estimate. The creation of the likelihood (hereinafter "score") can comprise any conventional form of creation, including utilizing a proprietary algorithm to combine the results of the analysis of heuristic metrics and/or processing the score with a threshold.

Referring to FIG. 1, in one embodiment, the categorical estimates created are the foreground channel estimate (generate foreground channel estimate 1404a), and the background channel estimate (generate background channel estimate 1404b). In one embodiment, the scores created for the foreground channel estimate utilize a different algorithm than the algorithm utilized to create the scores for the background channel estimate. For example, the data from each heuristic metric analysis will be processed with different algorithms and/or different thresholds for the foreground channel estimate score than the algorithms and/or thresholds utilized for the background channel estimate score.

In some embodiments, each input channel displayed in FIG. 5 will have a score for the foreground channel estimate and an independent score for the background channel estimate. In one embodiment, the score is utilized to determine whether a certain channel is utilized in creating the categorical estimate 1404. For example, the score created for the foreground channel estimate for the channel red might have a value of 0.85, the score created for the foreground channel estimate for the channel blue might have a value of 0.75, and the score created for the foreground channel estimate for the channel pink might have a value of 0.25. In one embodiment, one may chose to utilize channels that meet a certain threshold value for the score to determine which channels to utilize in creating the foreground channel estimate and the same or different threshold value to determine which channels to utilize in creating the background channel estimate. For example, if the threshold value selected for the foreground channel estimate score is defined as greater than or equal to 0.60, then channel red and channel blue would be utilized in merging the channel categorical estimate (e.g. foreground channel estimate). A similar procedure could be utilized to select the one or more channels that will be merged to create the background channel estimate.

After selecting or determining, for each respective categorical estimate (e.g., foreground channel estimate 1404a, background channel estimate 1404b, tie breaker channel estimate 140c), which channel or channels will be utilized to create the respective categorical estimate, the one or more channels are utilized to do so. In one embodiment, the channels selected to create a channel estimate 1404 are merged or combined. The operation in which channels are merged or otherwise combined can comprise any conventional form of merging or combination of two or more channels of data, including pixel by pixel, based on the pixel weight per channel being combined. For example, consider the case in which channels A and B are being combined to generate a foreground channel estimate and a pixel that is present in both channels A and B is being considered to determine what strength the pixel will be assigned in the foreground channel estimate. In some embodiments, the strength of the pixel in the foreground channel will be a function of (i) the weight of the pixel in channel A modified by a score assigned to channel A against the one or more heuristics and (ii) the weight of the pixel in channel B modified by a score assigned to channel B against the one or more heuristics. If more than two channels (e.g., component channels) are being combined to form a foreground channel estimate, than the strength of a pixel in the foreground channel estimate that is present in all of the individual component channels will be the combination of the weight of the pixel in each component channel where each respective weight is modified by the score of corresponding component channel.

In some embodiments, a pixel by pixel approach allows for processing the merger or combination operation to form a channel estimate 1404 based on the pixel weight determined per pixel within each channel. As illustrated above, in some embodiments, a weight is assigned to a pixel within a channel based on its fuzzy membership to the color associated with the channel. In some embodiments, the categorical estimate is created pixel by pixel depending on the pixel's weight per channel selected and per each channel the pixel is included in. From the example above, the channel red and the channel blue is selected to create the foreground channel estimate. To do so, channel red and channel blue are merged or combined (hereinafter "combined"). In one embodiment, all the pixels within the channel or channels selected are included to create a categorical estimate. In this example, this would mean all the pixels which where selected in the channel red and the channel blue are selected or combined to create the foreground channel estimate.

In an alternative embodiment, all the pixels from all the selected channels receive a strength or weight value (hereinafter "strength") for a categorical estimate, based on the pixel's weight and channel's or channels' scores. Calculating the strength may provide for one way of calculating the certainty of each pixel within the categorical estimate. In one embodiment, the strength is determined by the pixel weight multiplied by the score of the channel the pixel is included in. In one example, the strength of a pixel is 0.49 if the weight of the pixel is 0.70 and the score of the channel the pixel is included in is 0.70 (e.g., 0.70×0.70). In one embodiment, the strength is utilized to create a categorical estimate 1404.

As mentioned above, a pixel may be included in more than one channel. In one embodiment, the strength of a pixel is determined by utilizing the pixel's weight and the channel's score for each channel the pixel is included in. An exemplary formula for determine the strength of a pixel which is included in two or more channels is:

$$\text{strength} = 1 - (1-X_1)(1-X_2)\ldots(1-X_n)$$

In this formula, $X_1$ represents the value of the weight of a pixel within channel 1 multiplied by the score of channel 1, $X_2$ represents the value of the weight of the pixel within channel 2 multiplied by the score of channel 2, and $X_n$ represents the value of the weight of the pixel within channel n multiplied by the score of channel n, where n the integer 3 or greater. In some embodiments, the strength of a pixel that is included in more than one selected channels is determined by adding the strengths of that pixel from each channel. The strength calculating operation can comprise of any conventional form of calculating the strength of a pixel, including the following formula:

$$\text{strength} = \max(X_1, X_2, \ldots, X_n)$$

meaning that the strength of the pixel is the maximum weight assigned to the pixel in and of the channels used to construct the channel estimate.

In some embodiments, only the pixels within the selected channels that meet a certain criteria are included or combined to create the categorical estimate. For example, in some embodiments, the weight of a pixel in a channel determines whether that pixel is included within the categorical estimate. To illustrate, consider the case in which a given channel is to be included in a channel estimate. A determination of whether an ih pixel in the given channel is to be included in the channel estimate is made based on the weight of the pixel in the channel. In some embodiments, the determination of which pixels within a selected channel are to be included could be based on any algorithm or algorithms tuned to create the best possible results.

Figure 8:
FIG. 8 illustrates a sample foreground channel estimate based on the color channels in FIG. 5 and FIG. 6 according to one embodiment, where the color black represents pixels or pixel regions not included, and the colors white to different shades of gray represent pixels or pixel regions included, the white to different shades of gray based on the strength of the pixel.

FIG. 8 is a sample foreground channel estimate based on the color channels in FIG. 5 and FIG. 6 according to one embodiment, where the color black represents pixel regions not included, and the colors white to different shades of gray represent pixel regions included, where the white to different shades of gray are based on the strength of the pixel.

As should be evident to one skilled in the art, the threshold for score values, as set forth above, might lead to one or more channels that are not included in certain created categorical estimates. In this situation, a generic or tie breaker channel estimate can be created or utilized. The purpose of the tie breaker channel estimate can be to utilize the information from the channel or channels not utilized in the other categorical estimates. It will be evident to one skilled in the art that the tie breaker channel estimate may not be used if all channels can be utilized by the other categorical estimates.

In the embodiment illustrated in FIG. 1, a tie breaker channel estimate 1404c is generated for any channel or channels that do not get utilized by the foreground channel estimate 1404a or the background channel estimate 1404b generation. In the example given above, this may be due to the score of a channel not falling within the threshold required for each categorical estimate generation.

Creating a tie breaker channel estimate operation can comprise any conventional form of creating a tie breaker channel estimate with channels not utilized by the other categorical estimates, including combining the information per pixel in each channel. In one embodiment, the tie breaker channel estimate is created by obtaining a tie breaker channel estimate score for each channel not utilized in the other categorical estimates, and then combining the channels as illustrated above. In one example, the score for a channel as created for the tie breaker channel estimate is created by subtracting the score for that channel as created for the foreground channel estimate from the score for that channel as created for the background channel estimate. Utilizing this score, the tie breaker channel estimate can be created by combining all the channels not utilized in the other categorical estimates in a pixel by pixel approach as illustrated above. For example, utilizing the strength of each pixel, as illustrated above, the tie breaker channel estimate can be created.

Figure 9:
FIG. 9 illustrates a sample tie breaker channel estimate based on the color channels in FIG. 5 and FIG. 6 according to one embodiment, where the color black represents pixels or pixel regions not included, and the colors white to different shades of gray represent pixels or pixel regions included, the white to different shades of gray based on the strength of the pixel.

FIG. 9 is a sample tie breaker channel estimate based on the color channels in FIG. 5 and FIG. 6 according to one embodiment, where the color black represents pixels or pixel regions not included, and the colors white to different shades of gray represent pixels or pixel regions included, the white to different shades of gray based on the strength of the pixel.

In some embodiments, after two or more categorical estimates are derived or created, the categorical estimates are merged to create a final channel estimate. For example, referring to step 1405 of FIG. 1, after the foreground channel estimate 1404a, the background channel estimate 1404b, and/or tie breaker channel estimate 1404c are created they are combined or merged. This combining or merging can be done on a pixel by pixel basis. For example, the merging can be done to create the distinguishing or segmenting of foreground of an image from the background of an image or vice versa. The combining or merging of the categorical estimates operation can comprise any conventional form of combining or merging the data in the categorical estimates. In one embodiment, the foreground channel estimate is averaged with the inverse of the background channel estimate and the tie breaker estimate is added in. An example of this method is illustrated in the equation:

$$FI = ((FCE + (1 - BCE))/2) + TBCE$$

In the formula, FI represents the foreground of the image as a final channel estimate, FCE is the foreground channel estimate 1404a; BCE is the background channel estimate 1404b, and TBCE is the tie breaker channel estimate 1404c. Advantageously, this combining or merging operation causes each pixel of the image being processed to be categorized into either the foreground or background with more certainty.

Another example of this method is:

$$FI_i = ((w_{i1}(FCE_i)^{w_{i2}} + w_{i3}(1-BCE_i)^{w_{i4}})/N) + w_{i5}(TBCE_i)$$
$$w_{i6}$$

where $FI_i$ is a value indicating whether pixel i is in the foreground of the image;

$FCE_i$ is a strength of pixel i in the foreground channel estimate;

$BCE_i$ is a strength of pixel i in the background channel estimate;

$TBCE_i$ is a strength of pixel i in the tie breaker channel estimate;

N is a positive real number; and $w_{i1}, w_{i2}, w_{i3}, w_{i4}, w_{i5}$, and $w_{i6}$ are each independently a weight for pixel i. Each of $w_{i1}, w_{i2}, w_{i3}, w_{i4}, w_{i5}$, and $w_{i6}$ can be a weight of any kind, including any mathematical operation, any value. Each $w_{i1}, w_{i2}, w_{i3}, w_{i4}, w_{i5}$, and $w_{i6}$ can be the same or different. In some embodiments, N is $w_{i1} + w_{i3}$.

Figure 10:
FIG. 10 illustrates a sample final channel estimate based on a foreground channel estimate, a background channel estimate, and a tie breaker channel estimate according to one embodiment, wherein the color black represents pixels or pixel regions not included in the final channel estimate and the color white represents pixels or pixel regions included in the final channel estimate.

FIG. 10 is a sample final channel estimate based on a foreground channel estimate, a background channel estimate, and a tie breaker channel estimate according to one embodiment, where the color black represents one or more pixel regions not included in the final channel estimate and the color white represents one or more pixels regions included in the final channel estimate.

Figure 11:
FIG. 11 illustrates the final channel estimate of FIG. 10 after pixel noise has been removed according to one embodiment.

In one embodiment, the merging of categorical estimates 1405 will result in a characterization of each pixel as being within the foreground or background of an image. Optionally, the merged categorical estimates 1405 may have additional processing done after the characterization of the pixels. For example, the processing may determine whether there is likelihood of an error for a particular characterization of a pixel. This error could be referred to as pixel noise. Pixel noise could also be made up of small incorrectly classified image regions. These incorrectly classified regions form "pixel islands" or "holes" in the segmentation. To correct the pixel noise, the present embodiment may remove segmentation noise 1406. The segmentation noise removal 1406 may apply various techniques to reclassify small regions from foreground to background (so-called "island removal") or vice versa (so called "hole filling"). For example, if a pixel is classified as foreground, but is surrounded by pixels classified as background, it is likely to be spurious and can be removed from the figure by switching its classification. FIG. 11 is the final channel estimate of FIG. 10 after pixel noise has been removed according to one embodiment.

Figure 12:
FIG. 12 illustrates the final channel estimate of FIG. 11 with the original image data from FIG. 4 overlaid for the pixels included in the final channel estimate of FIG. 1.

Referring to FIG. 1, in step 1407, the image being processed is outputted with the segmentation developed through steps 1401 through 1406. In some embodiments the segmentation displays the foreground of the image or the background of the image. Optionally, the output could contain the entire image with the foreground and background distinguished from each other. FIG. 12 is the final channel estimate of FIG. 11 with the original image data from FIG. 4 overlaid for the pixels included in the final channel estimate of FIG. 11.

Figure 2:
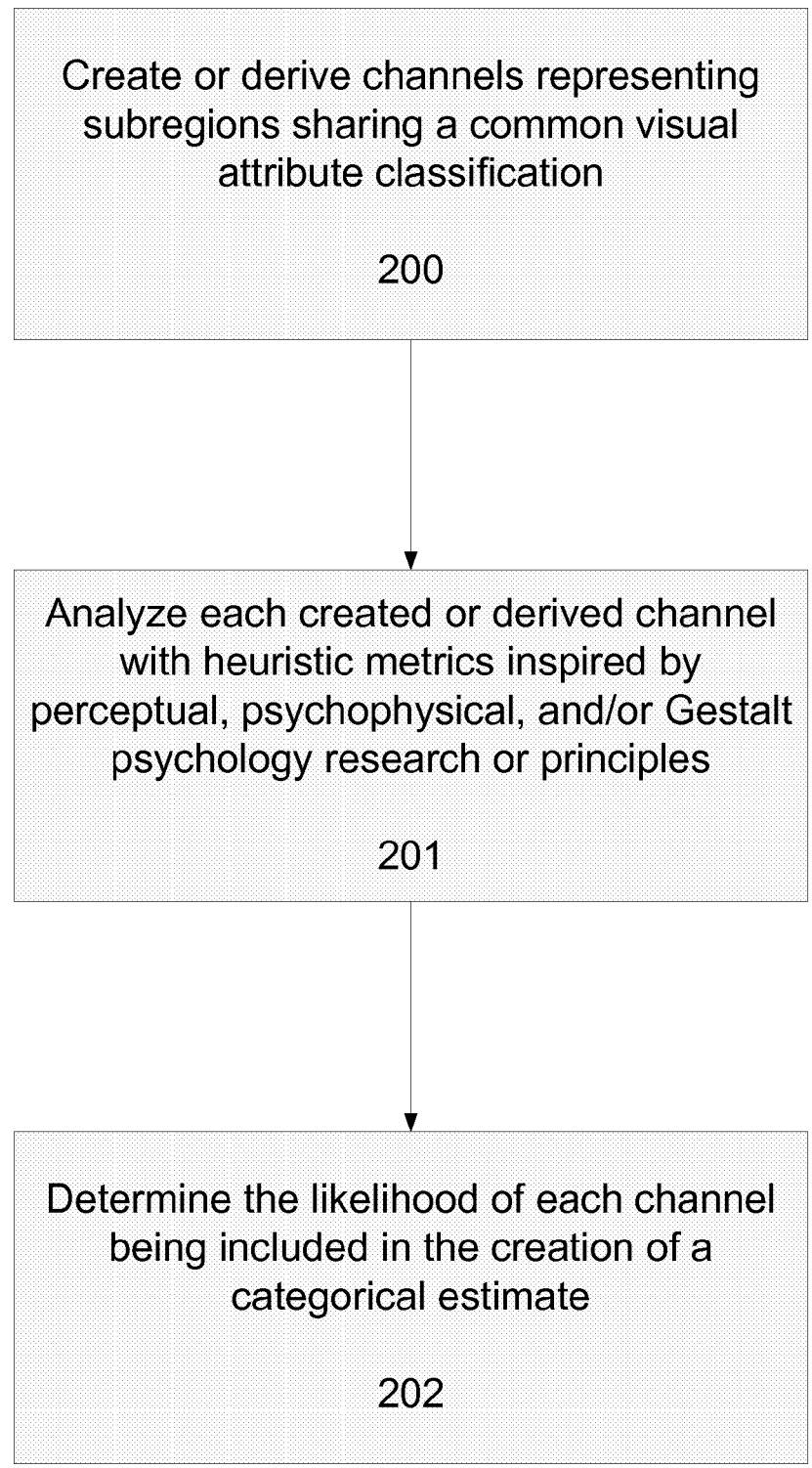
FIG. 2 is a top-level flow chart illustrating an exemplary embodiment of a method for determining whether a channel should be included in creating a categorical estimate when segmenting an image based on perceptual information in accordance with an embodiment of the present invention.

FIG. 2 is a top-level flowchart illustrating an exemplary embodiment of a method for determining whether a channel should be included in a categorical estimate when segmenting an image based on perceptual information. In the embodiment, one or more channels are created or derived in step 200. Then, in step 201, each created or derived channel is analyzed with heuristic metrics inspired by perceptual, psychophysical, and/or Gestalt psychology research or principles. Next, in step 202, the likelihood of each channel being included in a categorical estimate is determined.

Figure 3:
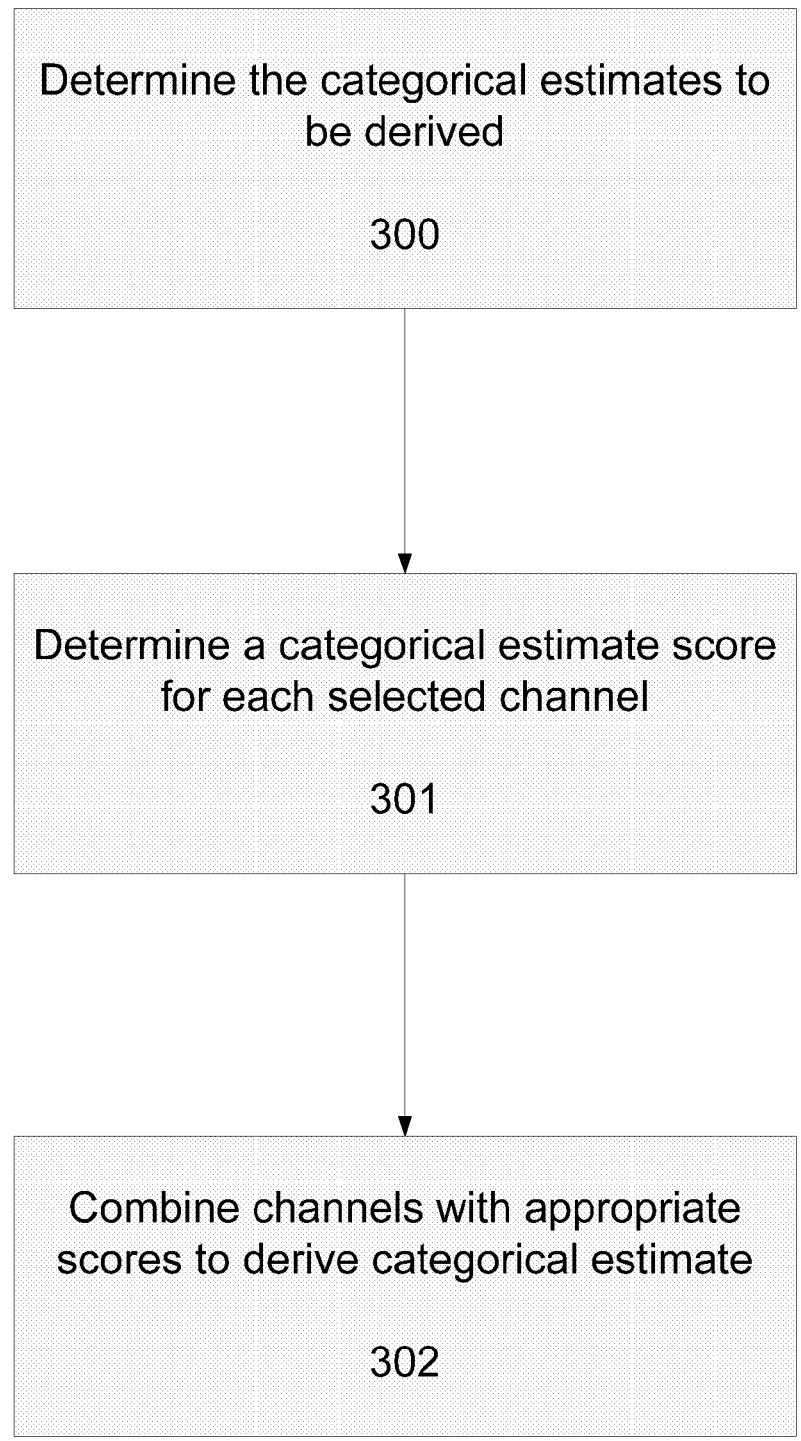
FIG. 3 is a top-level flow chart illustrating an exemplary embodiment of a method for deriving a categorical estimate when segmenting an image based on perceptual information.

FIG. 3 is a top-level flowchart illustrating an exemplary embodiment of a method for deriving a categorical estimate when segmenting an image based on perceptual information. In the embodiment, one determines the categorical estimate or different categorical estimates to be derived in step 300. In step 301, a categorical estimate score is determined for each selected channel. Next, in step 302, channels are combined with appropriate scores to derive a categorical estimate 302.

Figure 13:
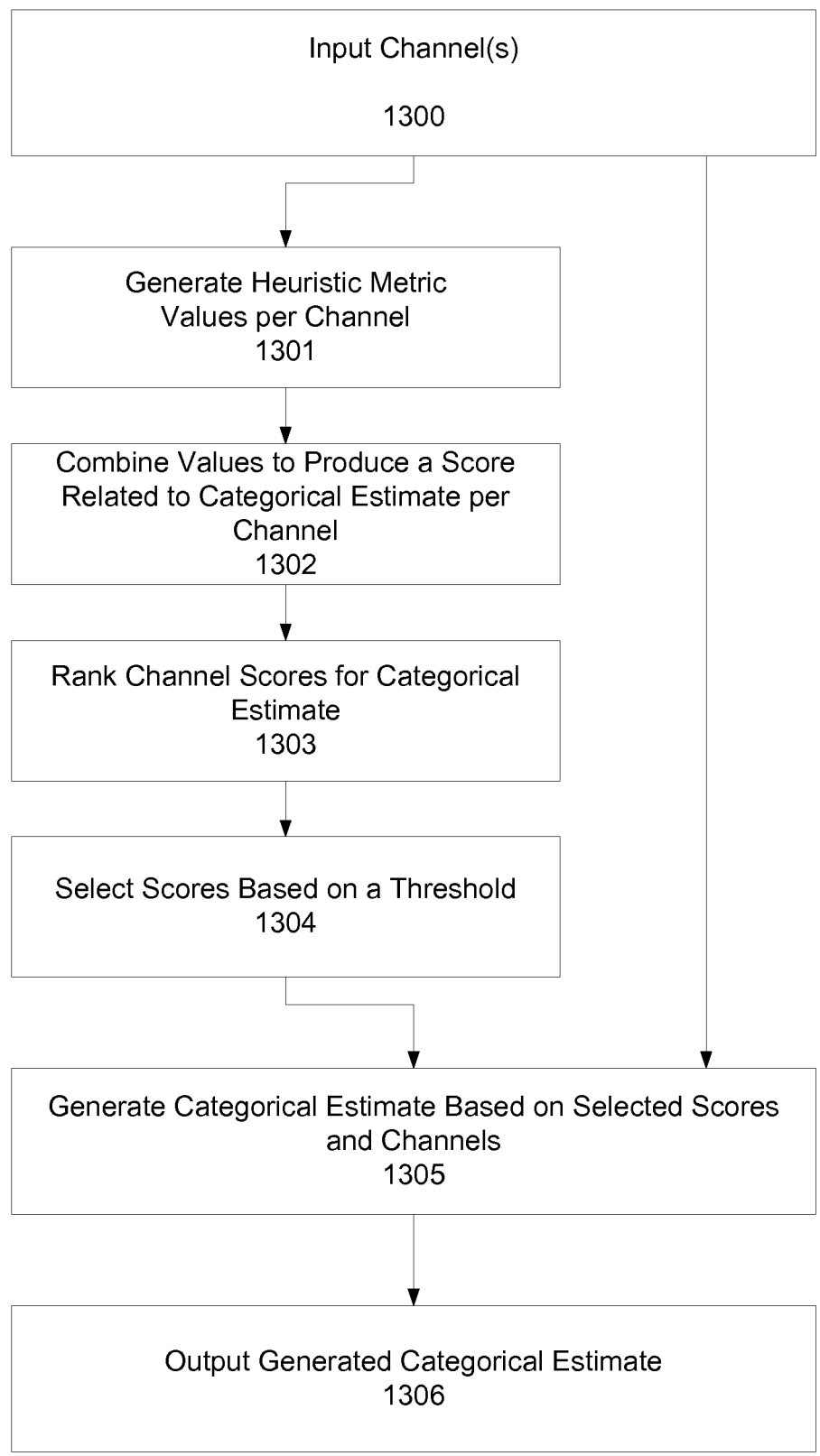
FIG. 13 illustrates a top-level flow chart illustrating another exemplary embodiment of a method for deriving a categorical estimate when segmenting an image based on perceptual information.

FIG. 13 is a top-level flow chart illustrating another exemplary embodiment of a method for deriving a categorical estimate when segmenting an image based on perceptual information. In this embodiment, channels are inputted in step 1300. In step 1301 one or more heuristic metric values are generated per channel. Next, in step 1302 the values created in step 1301 are combined to produce a score related to a categorical estimate. Each of the scores created are then ranked in step 1303 and the scores that are above a threshold are selected in step 1304. Based off of the selected scores from step 1304 and the inputted channels from step 1300, a categorical estimate is generated in step 1305. Lastly, once the categorical estimate or estimates are created in step 1305, they are outputted in step 1306.

Figure 14:
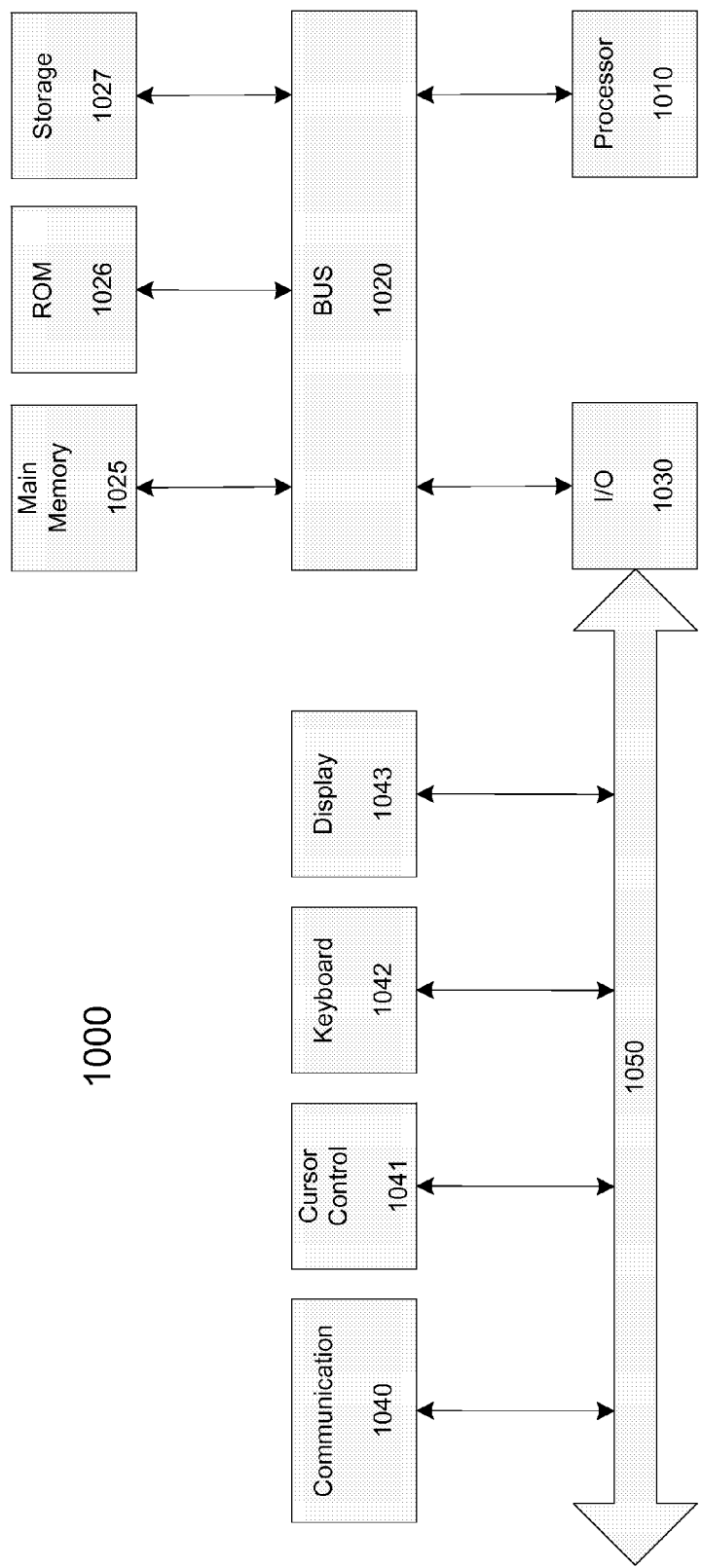
FIG. 14 is an exemplary illustration of computer architecture for use with the present system, according to one embodiment.

FIG. 14 is an exemplary illustration of computer architecture for use with the present system, according to one embodiment. Computer architecture 1000 can be used to implement the computer systems or image processing systems described in various embodiments of the invention. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 also may be used to store temporary variables or other intermediate information during execution of instructions by processor 1010. Architecture 1000 also may include a read only memory (ROM) and/or other static storage device 1026 coupled to bus 1020 for storing static information and instructions used by processor 1010.

A data storage device 1027 such as a magnetic disk or optical disk and its corresponding drive may also be coupled to computer system 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041). For example, web pages and business related information may be presented to the user on the display device 1043.

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by claims following.

What is claimed:

1. A method of processing a digital image comprising a plurality of pixels, the method comprising:

(A) utilizing at least one computer for deriving a plurality of input channels for said digital image, each input channel in the plurality of input channels representing a visual attribute classification in a plurality of visual attribute classifications, each respective input channel in the plurality of input channels comprising all or a portion of the pixels in the plurality of pixels and, for each respective pixel in the respective input channel, a weight for the respective pixel that represents a similarity between an attribute of the respective pixel and the visual attribute classification of the respective channel;

(B) determining, for each respective input channel in the plurality of input channels, one or more heuristic scores for the respective input channel by evaluating a distribution of weighted pixels in the respective input channel against one or more heuristic metrics;

(C) forming a plurality of categorical estimates, wherein each categorical estimate in the plurality of categorical estimates comprises a selection of one or more input channels in the plurality of input channels based on the one or more heuristic scores determined for each of the one or more input channels in the determining step (B);

(D) merging the plurality of categorical estimates to create a final channel estimate, wherein the final channel estimate categorizes each pixel in the plurality of pixels in the digital image based on a pixel strength of a corresponding pixel in each categorical estimate in the plurality of categorical estimates that is merged to create the final channel estimate; and (E) outputting the final channel estimate or one or more of the plurality of categorical estimates to a display a computer readable memory, or a computer readable medium.

2. The method of claim 1, wherein the deriving step A) comprises:
(i) selecting a visual attribute classification in the plurality of visual attribute classifications for a respective input channel in the plurality of input channels, thereby associating the visual attribute classification with the respective input channel; and
(ii) assigning, for each respective pixel in the plurality of pixels in the digital image, a weight to the respective pixel based on a comparison of the attribute of the respective pixel and the visual attribute for the respective input channel, thereby providing the respective input channel with all or a portion of the pixels from the plurality of pixels of the digital image and, for each respective pixel in the respective input channel, a weight assigned to the respective pixel.

3. The method of claim 1, wherein deriving step (A) comprises:
(i) clustering the plurality of pixels in the digital image based on a visual attribute of each pixel in the plurality of pixels, thereby forming a plurality of pixel clusters, wherein each pixel cluster in the plurality of pixel clusters is a visual attribute classification in the plurality of visual attribute classifications; and
(ii) assigning each respective pixel cluster in the plurality of pixel clusters to the input channel in the plurality of input channels that represents the visual attribute classification in the plurality of visual attribute classifications that matches the visual attribute classification of the respective pixel cluster.

4. The method of claim 3, wherein the clustering step (i) comprises fuzzy k-means clustering of the plurality of pixels based on a visual attribute of each pixel in the plurality of pixels.

5. The method of claim 3, wherein
each visual attribute classification in the plurality of visual attribute classifications is a different color in a plurality of colors; and
the attribute of the respective pixel in the assigning step (ii) that is matched to the visual attribute of the respective input channel is a color of the pixel.

6. The method of claim 3, wherein the clustering step (i) comprises color binning.

7. The method of claim 3, wherein
each visual attribute classification in the plurality of visual attribute classifications is a different texture in a plurality of texture; and
a respective pixel cluster in the plurality of pixel clusters is deemed to match a visual attribute classification in the plurality of visual attribute classifications when the pixels in the respective pixel cluster are located within a textural object defined by the visual attribute classification.

8. The method of claim 2, wherein
each visual attribute classification in the plurality of visual attribute classifications is a different texture in a plurality of texture; and
a respective pixel in the plurality of pixels is upweighted when the respective pixel is located within a textural object defined by the visual attribute for the respective input channel.

9. The method of claim 1, wherein a heuristic metric in the one or more heuristic metrics is dominance, outerness, or centeredness.

10. The method of claim 1, wherein the selection of one or more input channels in the plurality of input channels for a categorical estimate in the plurality of categorical estimates comprises determining a likelihood that an input channel in the plurality of input channels is a member of the categorical estimate based on the one or more heuristic scores for the respective input channel, wherein, when the likelihood that the input channel is a member of the categorical estimate exceeds a threshold value, the input channel is deemed to be a member of the categorical estimate.

11. The method of claim 1, wherein the plurality of categorical estimates comprises a foreground channel estimate and a background channel estimate.

12. The method of claim 1, wherein the plurality of categorical estimates comprises a foreground channel estimate, a background channel estimate, and a tie breaker channel estimate.

13. The method of claim 1, wherein the plurality of categorical estimates consists of a foreground channel estimate, a background channel estimate, and a tie breaker channel estimate.

14. The method of claim 1, wherein the plurality of categorical estimates comprises a foreground channel estimate and a background channel estimate, wherein the forming step (C) comprises:
selecting one or more input channels in the plurality of input channels for the foreground channel estimate by determining a first likelihood that an input channel in the plurality of input channels is a member of the foreground channel estimate based on the one or more heuristic scores for the respective input channel, wherein, when the first likelihood that the input channel is a member of the foreground channel estimate exceeds a first threshold value, the input channel is deemed to be a member of the foreground channel estimate; and
selecting one or more input channels in the plurality of input channels for the background channel estimate by determining a second likelihood that an input channel in the plurality of input channels is a member of the background channel estimate based on the one or more heuristic scores for the respective input channel, wherein, when the second likelihood that the input channel is a member of the background channel estimate exceeds a second threshold value, the input channel is deemed to be a member of the background channel estimate.

15. The method of claim 14 wherein the first threshold value is different than the second threshold value.

16. The method of claim 1, wherein the plurality of categorical estimates comprises a foreground channel estimate and a background channel estimate, wherein the forming step (C) comprises:
selecting one or more input channels in the plurality of input channels for the foreground channel estimate by determining a first likelihood that an input channel in the plurality of input channels is a member of the foreground channel estimate based on the one or more heuristic scores for the respective input channel, wherein, when the first likelihood that the input channel is a member of the foreground channel estimate is in a first range, the input channel is deemed to be a member of the foreground channel estimate; and selecting one or more input channels in the plurality of input channels for the background channel estimate by determining a second likelihood that an input channel in the plurality of input channels is a member of the background channel estimate based on the one or more heuristic scores for the respective input channel, wherein, when the second likelihood that the input channel is a member of the background channel estimate is in a second range, the input channel is deemed to be a member of the background channel estimate.

17. The method of claim 16, wherein the first range is different than the second range.

18. The method of claim 1, wherein a categorical estimate in the plurality of categorical estimates comprises two or more input channels and wherein the forming step (C) comprises merging the two or more input channels to form the categorical estimate.

19. The method of claim 18, wherein the merging step comprises assigning a strength to a first pixel in the plurality of pixels in the image based on a function of
  a weight of a second pixel from a first input channel in the two or more input channels modified by the one or more heuristic scores for the first input channel; and
  a weight of a third pixel from a second input channel in the two or more input channels modified by the one or more heuristic scores for the first input channel;
  wherein the first pixel, the second pixel, and the third pixel occupy the same position in the digital image.

20. The method of claim 1, wherein a categorical estimate in the plurality of categorical estimates comprises a plurality of input channels and wherein the forming step (C) comprises merging the plurality of input channels to form the categorical estimate on a pixel by pixel basis using the formula:

$$\text{strength}=1-(1-X_1)(1-X_2)\ldots(1-X_n)$$

wherein
  strength is the strength of a pixel in the plurality of pixels in the digital image;
  $X_1$ is a value of a weight of the pixel within a first channel input in the plurality of input channels multiplied by a score of the first input channel derived from the one or more heuristic scores for the first input channel;
  $X_2$ is a value of a weight of the pixel within a second channel input in the plurality of input channels multiplied by a score of the second input channel derived from the one or more heuristic scores for the second input channel; and
  $X_n$ is a value of a weight of the pixel within an $n^{th}$ channel input in the plurality of input channels multiplied by a score of the $n^{th}$ input channel derived from the one or more heuristic scores for the $n^{th}$ input channel.

21. The method of claim 1, wherein a categorical estimate in the plurality of categorical estimates comprises a plurality of input channels and wherein the forming step (C) comprises merging the plurality of input channels to form the categorical estimate on a pixel by pixel basis using the formula:

$$\text{strength}=\max(X_1, X_2, \ldots, X_n)$$

strength is the strength of a pixel in the plurality of pixels in the digital image;
$X_1$ is a value of a weight of the pixel within a first channel input in the plurality of input channels multiplied by a score of the first input channel derived from the one or more heuristic scores for the first input channel;
$X_2$ is a value of a weight of the pixel within a second channel input in the plurality of input channels multiplied by a score of the second input channel derived from the one or more heuristic scores for the second input channel;
$X_n$ is a value of a weight of the pixel within an $n^{th}$ channel input in the plurality of input channels multiplied by a score of the $n^{th}$ input channel derived from the one or more heuristic scores for the nth input channel; and
max means that the maximum value in the set $\{X_1, X_2, \ldots, X_n\}$ is deemed to be the strength of the pixel.

22. The method of claim 1, wherein the plurality of categorical estimates comprises a foreground channel estimate, a background channel estimate, and a tie breaker channel estimate and wherein the merging step (D) comprises categorizing each pixel i in the plurality of pixels in the image as foreground using the formula:

$$FI_i=((FCE_i+(1-BCE_i))/2)+TBCE_i$$

wherein
  $FI_i$ is a value indicating whether pixel i is in the foreground of the image;
  $FCE_i$ is a strength of pixel i in the foreground channel estimate;
  $BCE_i$ is a strength of pixel i in the background channel estimate; and
  $TBCE_i$ is a strength of pixel i in the tie breaker channel estimate.

23. The method of claim 1, wherein the plurality of categorical estimates comprises a foreground channel estimate, a background channel estimate, and a tie breaker channel estimate and wherein the merging step (D) comprises categorizing each pixel i in the plurality of pixels in the image as foreground using the formula:

$$FIi=(w_{i1}(FCE_i)^{wi2}+w_{i3}(1-BCE_i)^{wi4})/N+w_{i5}(TBC_i)^{wi6}$$

wherein
  $FI_i$ is a value indicating whether pixel i is in the foreground of the image;
  $FCE_i$ is a strength of pixel i in the foreground channel estimate;
  $BCE_i$ is a strength of pixel i in the background channel estimate;
  $TBCE_i$ is a strength of pixel i in the tie breaker channel estimate;
  N is a positive real number; and
  $w_{i1}$, $w_{i2}$, $w_{i3}$, $w_{i4}$, $w_{i5}$, and $w_{i6}$ are each independently a weight for pixel i.

24. The method of claim 1, wherein the final channel estimate comprises a binary representation for each pixel in the plurality of pixels I the digital image, wherein
  a first value for the binary representation of a pixel in the plurality of pixels indicates that the pixel is a member of the final channel estimate; and
  a second value for the binary representation of the pixel indicates that the pixel is a not a member of the final channel estimate.

25. The method of claim 24 wherein the final channel estimate is for the foreground of the image.

26. The method of claim 24 wherein the final channel estimate is for the background of the image.

27. A system for processing a digital image comprising a plurality of pixels, the system comprising:
  (A) means for deriving a plurality of input channels for said digital image, each input channel in the plurality of input channels representing a visual attribute classification in a plurality of visual attribute classifications, each respective input channel in the plurality of input channels comprising all or a portion of the pixels in the plurality of pixels and, for each respective pixel in the respective input channel, a weight for the respective pixel that represents a similarity between an attribute of the respective pixel and the visual attribute classification of the respective channel;

(B) means for determining, for each respective input channel in the plurality of input channels, one or more heuristic scores for the respective input channel by evaluating a distribution of weighted pixels in the respective input channel against one or more heuristic metrics;

(C) means for forming a plurality of categorical estimates, wherein each categorical estimate in the plurality of categorical estimates comprises a selection of one or more input channels in the plurality of input channels based on the one or more heuristic scores determined for each of the one or more input channels in the determining step (B);

(D) means for merging the plurality of categorical estimates to create a final channel estimate, wherein the final channel estimate categorizes each pixel in the plurality of pixels in the digital image based on a pixel strength of a corresponding pixel in each categorical estimate in the plurality of categorical estimates that is merged to create the final channel estimate; and (E) means for outputting the final channel estimate or one or more of the plurality of categorical estimates to a display a computer readable memory, or a computer readable medium.

28. A computer program product for use in conjunction with a computer system, the computer program product comprising a computer readable storage medium and a computer program mechanism embedded therein for processing a digital image comprising a plurality of pixels, the computer program mechanism comprising instructions for:

(A) deriving a plurality of input channels for said digital image, each input channel in the plurality of input channels representing a visual attribute classification in a plurality of visual attribute classifications, each respective input channel in the plurality of input channels comprising all or a portion of the pixels in the plurality of pixels and, for each respective pixel in the respective input channel, a weight for the respective pixel that represents a similarity between an attribute of the respective pixel and the visual attribute classification of the respective channel;

(B) determining, for each respective input channel in the plurality of input channels, one or more heuristic scores for the respective input channel by evaluating a distribution of weighted pixels in the respective input channel against one or more heuristic metrics;

(C) forming a plurality of categorical estimates, wherein each categorical estimate in the plurality of categorical estimates comprises a selection of one or more input channels in the plurality of input channels based on the one or more heuristic scores determined for each of the one or more input channels in the determining step (B);

(D) merging the plurality of categorical estimates to create a final channel estimate, wherein the final channel estimate categorizes each pixel in the plurality of pixels in the digital image based on a pixel strength of a corresponding pixel in each categorical estimate in the plurality of categorical estimates that is merged to create the final channel estimate; and (E) outputting the final channel estimate or one or more of the plurality of categorical estimates to a display a computer readable memory, or a computer readable medium.

29. A computer, comprising:

a main memory;

a processor; and one or more programs for processing a digital image comprising a plurality of pixels, stored in the main memory and executed by the processor, the one or more programs collectively including instructions for:

(A) deriving a plurality of input channels for said digital image, each input channel in the plurality of input channels representing a visual attribute classification in a plurality of visual attribute classifications, each respective input channel in the plurality of input channels comprising all or a portion of the pixels in the plurality of pixels and, for each respective pixel in the respective input channel, a weight for the respective pixel that represents a similarity between an attribute of the respective pixel and the visual attribute classification of the respective channel;

(B) determining, for each respective input channel in the plurality of input channels, one or more heuristic scores for the respective input channel by evaluating a distribution of weighted pixels in the respective input channel against one or more heuristic metrics;

(C) forming a plurality of categorical estimates, wherein each categorical estimate in the plurality of categorical estimates comprises a selection of one or more input channels in the plurality of input channels based on the one or more heuristic scores determined for each of the one or more input channels in the determining step (B);

(D) merging the plurality of categorical estimates to create a final channel estimate, wherein the final channel estimate categorizes each pixel in the plurality of pixels in the digital image based on a pixel strength of a corresponding pixel in each categorical estimate in the plurality of categorical estimates that is merged to create the final channel estimate; and (E) outputting the final channel estimate or one or more of the plurality of categorical estimates to a display a computer readable memory, or a computer readable medium.

30. The method of claim 23, wherein N is $w_{i1}+w_{i3}$.

* * * * *